(12) United States Patent
Kim

(10) Patent No.: US 12,553,601 B2
(45) Date of Patent: Feb. 17, 2026

(54) LAMP FOR VEHICLE

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/180,847

(22) Filed: Apr. 16, 2025

(65) Prior Publication Data

US 2026/0002667 A1   Jan. 1, 2026

(30) Foreign Application Priority Data

Jun. 28, 2024   (KR) .......................... 10-2024-0085719

(51) Int. Cl.
| | |
|---|---|
| *F21V 33/00* | (2006.01) |
| *B60Q 1/00* | (2006.01) |
| *B60Q 5/00* | (2006.01) |
| *H04R 1/02* | (2006.01) |

(52) U.S. Cl.
CPC ........ *F21V 33/0056* (2013.01); *B60Q 1/0017* (2013.01); *B60Q 5/00* (2013.01); *H04R 1/025* (2013.01)

(58) Field of Classification Search
CPC ........ H04R 1/025; B60Q 5/00; B60Q 1/0017; F21V 33/005
See application file for complete search history.

(56) References Cited

U.S. PATENT DOCUMENTS

| | | | | |
|---|---|---|---|---|
| 2011/0255711 | A1* | 10/2011 | Ivey ..................... | F21V 33/0056 |
| | | | | 381/388 |
| 2016/0084493 | A1* | 3/2016 | Salter ...................... | B60Q 3/64 |
| | | | | 362/510 |

FOREIGN PATENT DOCUMENTS

| | | | | |
|---|---|---|---|---|
| EP | 3051834 A4 * | 9/2014 | ............... | H04R 1/00 |
| WO | WO-2023120166 A1 * | 6/2023 | ............... | B60Q 1/04 |

* cited by examiner

*Primary Examiner* — Leah Macchiarolo
(74) *Attorney, Agent, or Firm* — NSIP Law

(57) ABSTRACT

A lamp for a vehicle, and a system therefor are provided. The lamp includes a lamp housing part having an internal space to accommodate a light source; an outer lens part coupled to one side of the lamp housing part and to cover the internal space; and a vibration part fixed to the lamp housing part or the outer lens part. The vibration part includes a first module including a first magnet, fixed to one side of the outer lens part, and a second module facing the first module and including a second magnet facing the first magnet, a second magnet fixing portion to accommodate the second magnet, and a coil member provided at one side of the second magnet and accommodated in the second magnet fixing portion. A groove region is formed in an inner surface of either the outer lens part or the lamp housing part.

20 Claims, 14 Drawing Sheets

LAMP FOR VEHICLE

CROSS-REFERENCE TO RELATED APPLICATION

This application claims priority to and the benefit of Korean Patent Application No. 10-2024-0085719 filed in the Korean Intellectual Property Office on Jun. 28, 2024, the entire contents of which are incorporated herein by reference.

BACKGROUND

1. Field

The present disclosure relates to a lamp for a vehicle.

2. Description of the Related Art

Recently, with the increasing demand for entertainment functions in addition to transportation functions required for vehicles, there has been a growing need for lamps mounted in the vehicles and having additional functions in addition to simple lighting functions. For example, recently, a lamp for a vehicle has additionally adopted a function capable of performing communication with the outside.

In the related art, the lamp for a vehicle has performed the function of communication with the outside by means of visual information such as lighting images or light distribution patterns of the lamp for a vehicle. Meanwhile, the methods of performing the function of communication with the outside also include a method using auditory information, such as sounds, in addition to the method using visual information. However, because the lamp for a vehicle in the related art adopts a watertight structure to prevent moisture from accumulating in the lamp for a vehicle, it is difficult to mount a speaker, which is configured to output a sound, in the lamp for a vehicle.

SUMMARY

The present disclosure has been made in an effort to add a function, which is capable of outputting a sound, to a lamp for a vehicle without affecting performance of the lamp for a vehicle.

In a general aspect of the disclosure, a lamp for a vehicle includes: a lamp housing part having an internal space configured to accommodate a light source; an outer lens part coupled to one side of the lamp housing part and configured to cover the internal space; and a vibration part fixed to the lamp housing part or the outer lens part, wherein the vibration part includes a first module including a first magnet, and fixed to one side of the outer lens part, and a second module facing the first module, and including a second magnet facing the first magnet, a second magnet fixing portion configured to accommodate the second magnet, and a coil member provided at one side of the second magnet and accommodated in the second magnet fixing portion, wherein a groove region is formed in an inner surface of the outer lens part or an inner surface of the lamp housing part, and wherein the groove region has a recessed shape and defines a space that accommodates at least a partial region of the first module.

The vibration part may further include a first bonding member provided in the space defined by the groove region, the first bonding member being provided between the first module and the inner surface of the outer lens part or the inner surface of the lamp housing part.

The groove region may include a first groove region configured to define a space that accommodates the first bonding member, and a second groove region formed at one side of the first groove region and configured to define a space that accommodates the first module, wherein a stepped portion may be formed at a boundary between the first groove region and the second groove region.

A width of the first groove region in a direction intersecting a direction in which the first module faces the first bonding member may be smaller than a width of the second groove region.

The outer lens part may include a first outer lens region having a first transmittance rate corresponding to a transmittance rate for visible rays, and a second outer lens region having a second transmittance rate corresponding to a transmittance rate for visible rays lower than the first transmittance rate, wherein the first module may be accommodated in the groove region formed in the second outer lens region.

The lamp may further include a lamp bezel part having one side fixedly coupled to the lamp housing part, the lamp bezel part being provided to at least partially face the outer lens part, wherein the second module may be fixed to one side of the lamp bezel part.

The lamp bezel part may be made of a material having impermeability for visible rays.

A bezel groove region may be formed in the lamp bezel part, wherein the bezel groove region may have a recessed shape and define a space that accommodates at least a partial region of the second module.

The vibration part may further include a second bonding member provided in the space defined by the bezel groove region, the second bonding member being provided between the lamp bezel part and the second module.

The bezel groove region may include a first bezel groove region configured to define a space that accommodates the second bonding member, and a second bezel groove region formed at one side of the first bezel groove region and configured to define a space that accommodates the second module, wherein a stepped portion may be formed at a boundary between the first bezel groove region and the second bezel groove region.

A width of the first bezel groove region in a direction intersecting a direction in which the second module faces the second bonding member may be smaller than a groove of the second bezel groove region.

The lamp may further include: a bracket member to which the second module is fixedly coupled; a bolt member protruding from the inner surface of the outer lens part toward the bracket member and configured to penetrate the bracket member; and a nut member provided to face the inner surface of the outer lens part with the bracket member interposed therebetween, the nut member being coupled to the bolt member in a bolt-nut manner.

The bolt member may include a first bolt member and a second bolt member provided to face each other with the first module interposed therebetween.

The bracket member may include: a central region provided to be spaced apart from the inner surface of the outer lens part and configured such that the second module is fixed to the central region; peripheral regions provided at one side of the central region, provided to be spaced apart from each other toward the inner surface of the outer lens part, and at least partially tightly attached to the inner surface of the outer lens part; and connection regions configured to connect the central region and the peripheral regions.

The bolt member may penetrate the central region.

The nut member may include: a first nut member coupled to the bolt member in a bolt-nut manner in a state in which the first nut member is in contact with the bracket member; and a second nut member provided to face the bracket member with the first nut member interposed therebetween, the second nut member being coupled to the bolt member and the first nut member.

The lamp may further include a heat sink provided in the internal space, wherein one side of the second module may be fixed to the heat sink.

One side of the first module may be accommodated in the groove region formed in an upper or lower region of the inner surface of the lamp housing part that extends in a direction intersecting an upward/downward direction, wherein one side of the second module may be fixed to an upper or lower surface of the heat sink.

In another general aspect of the disclosure, a lamp system for a vehicle, includes: a lamp housing part having an internal space configured to accommodate a light source; an outer lens part coupled to one side of the lamp housing part and configured to cover the internal space; and a vibration part fixed to the lamp housing part or the outer lens part, the vibration part including a first module including a first magnet, and fixed to one side of the outer lens part, and a second module facing the first module, and including a second magnet facing the first magnet, a second magnet fixing portion configured to accommodate the second magnet, and a coil member provided at one side of the second magnet and accommodated in the second magnet fixing portion, wherein, in a first state, a constant interval between is maintained by the repulsive force between the first magnet and the second magnet, and wherein in a second state, an electric current is supplied to the coil member and a force applied between the first module and the second module is changed over time by an electromagnetic force, such that the first module vibrates to generate a sound output from the lamp.

A groove region may be formed in an inner surface of the outer lens part or an inner surface of the lamp housing part, wherein the groove region may have a recessed shape and define a space that accommodates at least a partial region of the first module.

According to the present disclosure, it is possible to add the function, which is capable of outputting a sound, to the lamp for a vehicle without affecting the performance of the lamp for a vehicle.

DETAILED DESCRIPTION

Hereinafter, a lamp for a vehicle according to the present disclosure will be described with reference to the drawings.

Lamp for Vehicle

Figure 1:
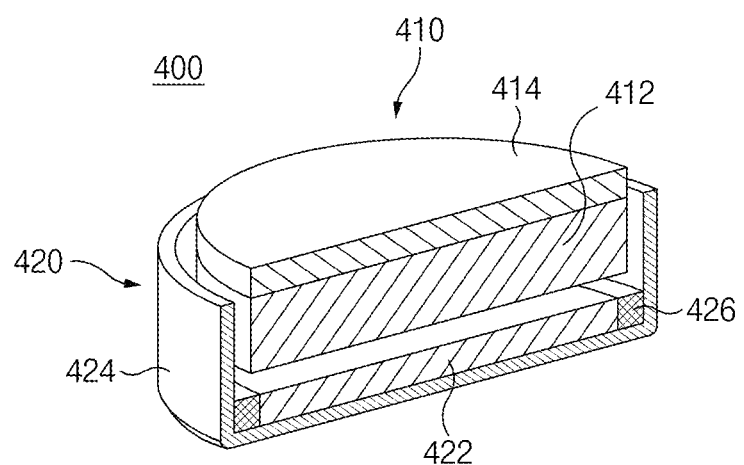
FIG. 1 is a view illustrating a cross-sectional structure of a vibration part provided in a lamp for a vehicle according to the present disclosure.
Figure 2:
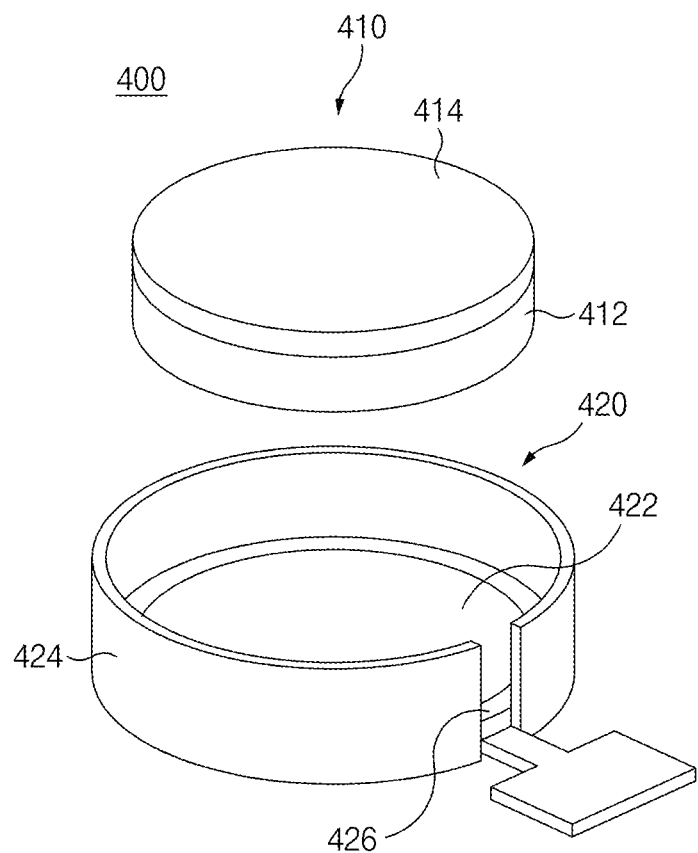
FIG. 2 is a view illustrating a state in which a first module and a second module of the vibration part provided in the lamp for a vehicle according to the present disclosure are spaced apart from each other.
Figure 3:
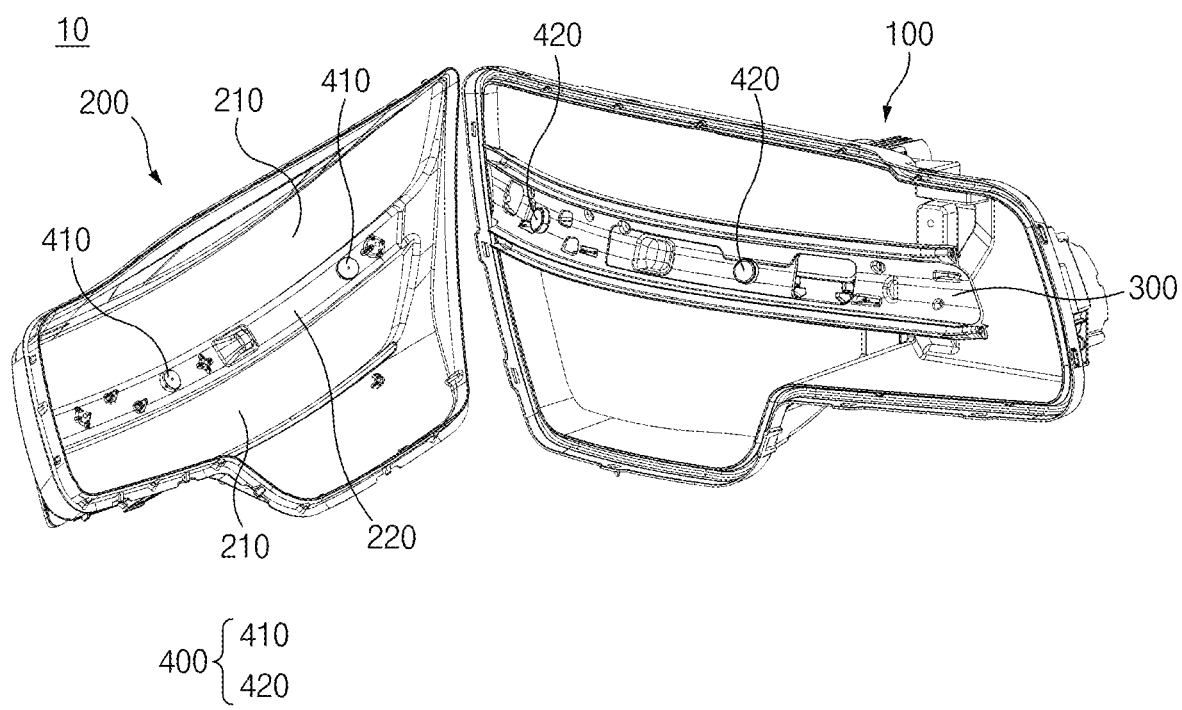
FIG. 3 is a view illustrating a state in which an outer lens part is spaced apart from a lamp housing part and a lamp bezel part in a lamp for a vehicle according to an example of the present disclosure.
Figure 4:
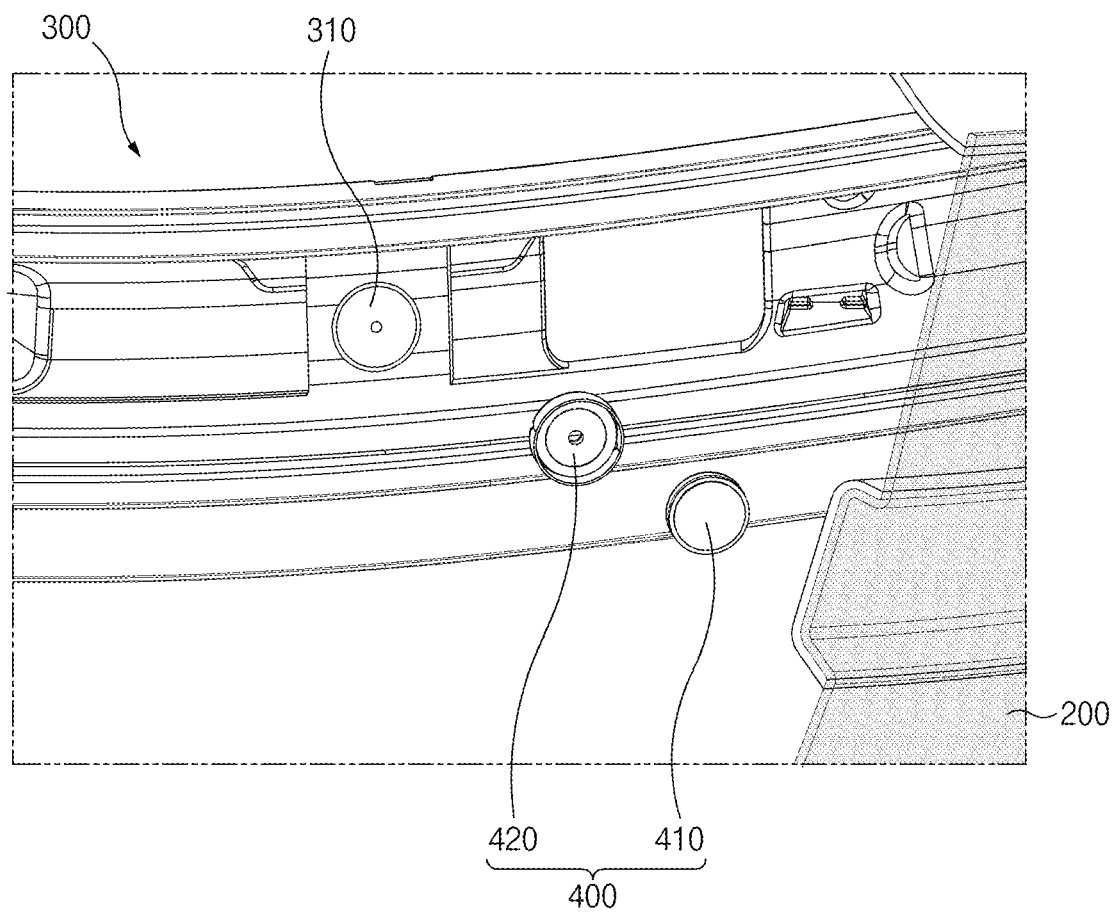
FIG. 4 is an exploded perspective view illustrating the lamp bezel part, the first module of the vibration part, and the second module of the vibration part illustrated in FIG. 3.
Figure 5:
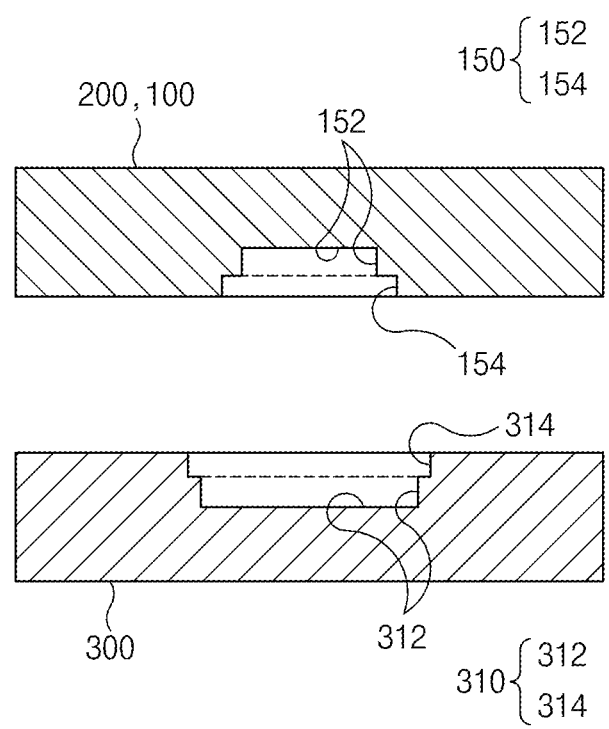
FIG. 5 is a cross-sectional view illustrating the lamp bezel part and the lamp housing part or the outer lens part of the lamp for a vehicle according to the example of the present disclosure.
Figure 6:
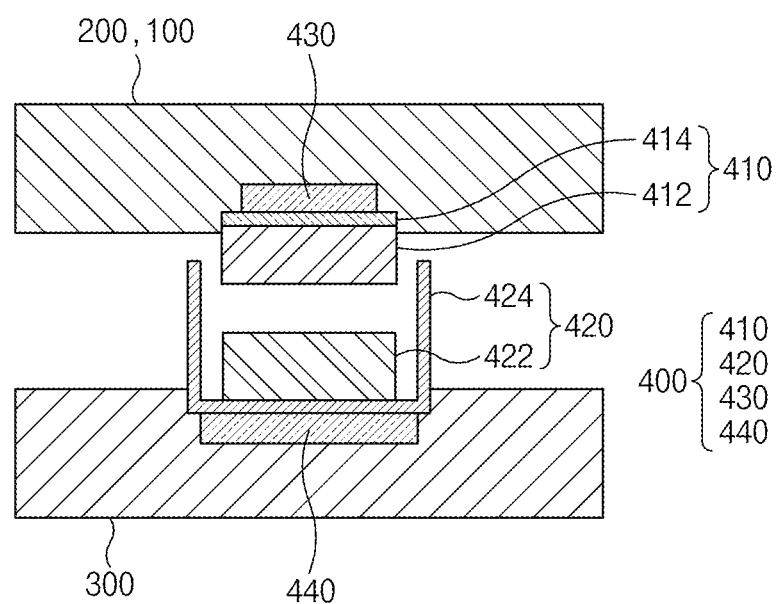
FIG. 6 is a cross-sectional view illustrating a state in which the first module and the second module are fixed to a structure illustrated in FIG. 5.

FIG. 1 is a view illustrating a cross-sectional structure of a vibration part provided in a lamp for a vehicle according to the present disclosure, and FIG. 2 is a view illustrating a state in which a first module and a second module of the vibration part provided in the lamp for a vehicle according to the present disclosure are spaced apart from each other. FIG. 3 is a view illustrating a state in which an outer lens part is spaced apart from a lamp housing part and a lamp bezel part in a lamp for a vehicle according to an example of the present disclosure, and FIG. 4 is an exploded perspective view illustrating the lamp bezel part, the first module of the vibration part, and the second module of the vibration part illustrated in FIG. 3. FIG. 5 is a cross-sectional view illustrating the lamp bezel part and the lamp housing part or the outer lens part of the lamp for a vehicle according to the example of the present disclosure, and FIG. 6 is a cross-sectional view illustrating a state in which the first module and the second module are fixed to a structure illustrated in FIG. 5.

With reference to FIGS. 1 to 6, a lamp 10 for a vehicle (hereinafter, referred to as a 'lamp') according to the present disclosure may include a lamp housing part 100 having an internal space configured to accommodate a light source, and an outer lens part 200 coupled to one side of the lamp housing part 100 and configured to cover the internal space. More specifically, the outer lens part 200 may be fixedly coupled to the lamp housing part 100. The light emitted from the light source may propagate to the outside through the outer lens part 200, such that predetermined light distribution patterns and lighting images may be formed.

Meanwhile, according to the present disclosure, the lamp 10 may not only form predetermined light distribution patterns and lighting images, like the lamp in the related art, but also generate a sound. More specifically, the lamp 10 according to the present disclosure may output a sound by vibrating the lamp housing part 100 or the outer lens part 200.

In order to achieve the above-mentioned object, the lamp 10 according to the present disclosure may include a vibration part 400 fixed to the lamp housing part 100 or the outer lens part 200. The vibration part 400 may be configured to output a sound by vibrating the lamp housing part 100 or the outer lens part 200. FIGS. 3 and 4 illustrate states in which a part (a first module to be described below) of the vibration part 400 is fixed to the outer lens part 200. In addition, the vibration part 400 may be accommodated in the internal space formed in the lamp housing part 100.

With reference to FIGS. 3 to 6, the lamp 10 according to the present disclosure may further include a lamp bezel part 300 having one side fixedly coupled to the lamp housing part 100, the lamp bezel part 300 being provided to at least partially face the outer lens part 200. More specifically, based on FIG. 2, one region of the outer lens part 200 may face the lamp bezel part 300 in case that the outer lens part 200 is assembled to the lamp housing part 100.

Meanwhile, with reference to FIGS. 1 and 2, the vibration part 400 may have a structure in which a plurality of modules is coupled. More specifically, the vibration part 400 may include a first module 410, and a second module 420 provided to face the first module 410. According to the embodiment of the present disclosure, the first module 410 may be fixed to one side of the lamp housing part 100 or one side of the outer lens part 200, and the second module 420 may be fixed to one side of the lamp bezel part 300. More specifically, as illustrated in FIGS. 3 to 6, the first module 410 may be fixed to the outer lens part 200, and the second module 420 may be fixed to the lamp bezel part 300.

In addition, according to the present disclosure, the vibration part 400 may be provided at a position in the lamp 10 at which the vibration part 400 may be protected from external direct sunlight. More specifically, the first module 410 of the vibration part 400 may be fixed to a region in the outer lens part 200 or the lamp housing part 100 that has low visible ray permeability, and the second module 420 of the vibration part 400 may be fixed to a region in the lamp bezel part 300 that has low visible ray permeability. For example, with reference to FIG. 3, in case that the first module 410 is fixed to the outer lens part 200, the outer lens part 200 may include a first outer lens region 210 having a transmittance rate for visible rays, i.e., a first transmittance rate, and a second outer lens region 220 having a transmittance rate for visible rays, i.e., a second transmittance rate lower than the first transmittance rate, and the first module 410 may be fixed to the second outer lens region 220. In addition, the second module 420 may be fixed to a region of the lamp bezel part 300 that faces the second outer lens region 220, and the lamp bezel part 300 may be made of a material having impermeability for visible rays. In this case, the light emitted from the light source in the lamp may not interfere with the vibration part 400, and the vibration part 400 may be prevented from being damaged by the light emitted from the light source in the lamp.

With reference back to FIGS. 1 and 2, the first module 410 may include a first magnet 412. The first magnet 412 may be a permanent magnet. In addition, the second module 420 may include a second magnet 422 provided to face the first magnet 412. The second magnet 422 may be a permanent magnet. More particularly, the first magnet 412 and the second magnet 422 may be disposed to apply a repulsive force therebetween. Meanwhile, the second module 420 may further include a second magnet fixing portion 424 configured to accommodate the second magnet 422, and a coil member 426 provided at one side of the second magnet 422 and accommodated in the second magnet fixing portion 424.

For example, as illustrated in FIGS. 1 and 2, the coil member 426 may be configured to surround an outer periphery of the second magnet 422. According to the present disclosure, at ordinary times, a constant interval between the first module 410 and the second module 420 is maintained by the repulsive force between the first magnet 412 and the second magnet 422. In case that an electric current is supplied to the coil member 426, a force applied between the first module 410 and the second module 420 is changed over time by an electromagnetic force, such that the first module 410 vibrates. Therefore, as the lamp housing part 100 or the outer lens part 200, to which the first module 410 is fixed, vibrates, a sound may be outputted from the lamp 10. Meanwhile, with reference to FIGS. 1 to 6, the first module 410 may further include a first magnet fixing portion 414 to which the first magnet 412 is fixed. For example, the first magnet fixing portion 414 may have an approximately circular plate shape.

Meanwhile, in the lamp 10 according to the present disclosure, a groove region 150 may be formed in an inner surface of the outer lens part 200 or an inner surface of the lamp housing part 100 and define a space that accommodates at least a partial region of the first module 410. For example, in case that the first module 410 is fixed to one side of the outer lens part 200, the groove region 150 may be formed in the outer lens part 200. In this case, with reference to FIGS. 5 and 6, the vibration part 400 may further include a first bonding member 430 provided in a space defined by the groove region 150, and the first bonding member 430 may be provided between the first module 410 and the inner surface of the outer lens part 200 or the inner surface of the lamp housing part 100. For example, in case that the first module 410 is fixedly coupled to the inner surface of the outer lens part 200, the first bonding member 430 may be provided between the outer lens part 200 and the first module 410. For example, the first bonding member 430 may be a bonding agent or an adhesive tape. In case that the first bonding member 430 is an adhesive tape, the adhesive tape may be made of a thin, hard material. A foam tape may not be preferable. The first bonding member 430 may be configured to allow the first module 410 to be fixed to the outer lens part 200 or the lamp housing part 100.

Meanwhile, as illustrated in FIG. 5, the groove region 150 may include a first groove region 152 configured to define a space that accommodates the first bonding member 430, and a second groove region 154 formed at one side of the first groove region 152 and configured to define a space that accommodates the first module 410. More specifically, a part of the first module 410 may be accommodated in the space defined by the second groove region 154. In this case, a stepped portion may be formed at a boundary between the first groove region 152 and the second groove region 154. It may be understood that a width of the first groove region 152 and a width of the second groove region 154 are different from each other. More specifically, a width of the first groove region 152 in a direction intersecting a direction in which the first module 410 faces the first bonding member 430 may be smaller than a width of the second groove region 154. Meanwhile, as described above, the first module 410 may be fixed to the second outer lens region 220 in case that the first module 410 is fixed to one side of the outer lens part 200. In this case, the groove region 150 may be formed in the second outer lens region 220, and the first module 410 may be accommodated in the groove region 150 formed in the second outer lens region 220.

Meanwhile, as in the embodiment of the present disclosure, a space for accommodating the second module 420 may also be formed in the lamp bezel part 300 in case that the second module 420 is fixed to the lamp bezel part 300. More specifically, as illustrated in FIG. 5, a bezel groove region 310 may be formed in the lamp bezel part 300, and the bezel groove region 310 may have a recessed shape and define a space that accommodates at least a partial region of the second module 420. In this case, with reference to FIGS. 5 and 6, the vibration part 400 may further include a second bonding member 440 provided in a space defined by the bezel groove region 310, and the second bonding member 440 may be provided between the lamp bezel part 300 and the second module 420. For example, the second bonding member 440 may be a bonding agent or an adhesive tape. In case that the second bonding member 440 is an adhesive tape, the adhesive tape may be made of a thin, hard material. A foam tape may not be preferable. The second bonding member 440 may be configured to allow the second module 420 to be fixed to the lamp bezel part 300.

Meanwhile, as illustrated in FIG. 5, the bezel groove region 310 may include a first bezel groove region 312 configured to define a space that accommodates the second bonding member 440, and a second bezel groove region 314 formed at one side of the first bezel groove region 312 and configured to define a space that accommodates the second module 420. More specifically, a part of the second module 420 may be accommodated in the space defined by the second bezel groove region 314. In this case, a stepped portion may be formed at a boundary between the first bezel groove region 312 and the second bezel groove region 314. It may be understood that a width of the first bezel groove region 312 and a width of the second bezel groove region 314 are different from each other. More specifically, a width of the first bezel groove region 312 in a direction intersecting a direction in which the second module 420 faces the second bonding member 440 may be smaller than a width of the second bezel groove region 314.

Figure 7:
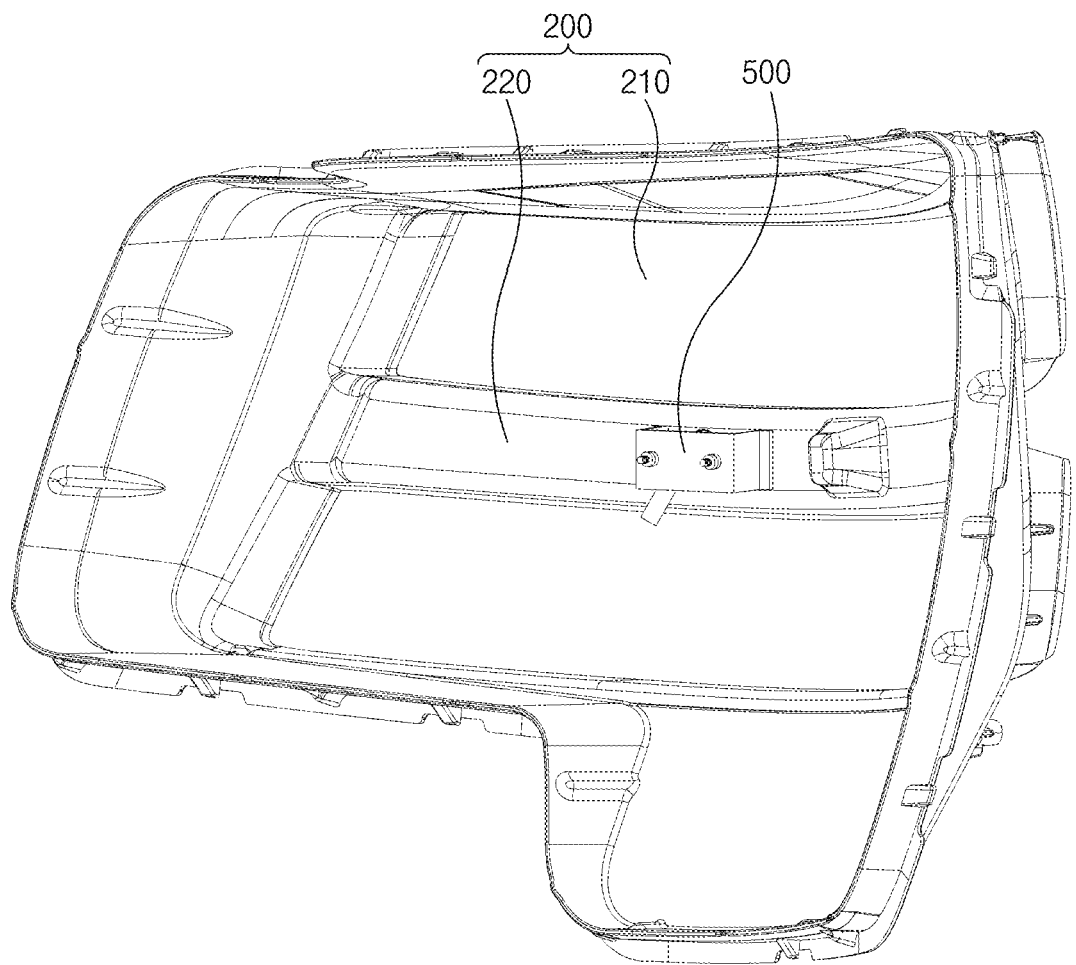
FIG. 7 is a perspective view of a lamp for a vehicle according to another example of the present disclosure.
Figure 8:
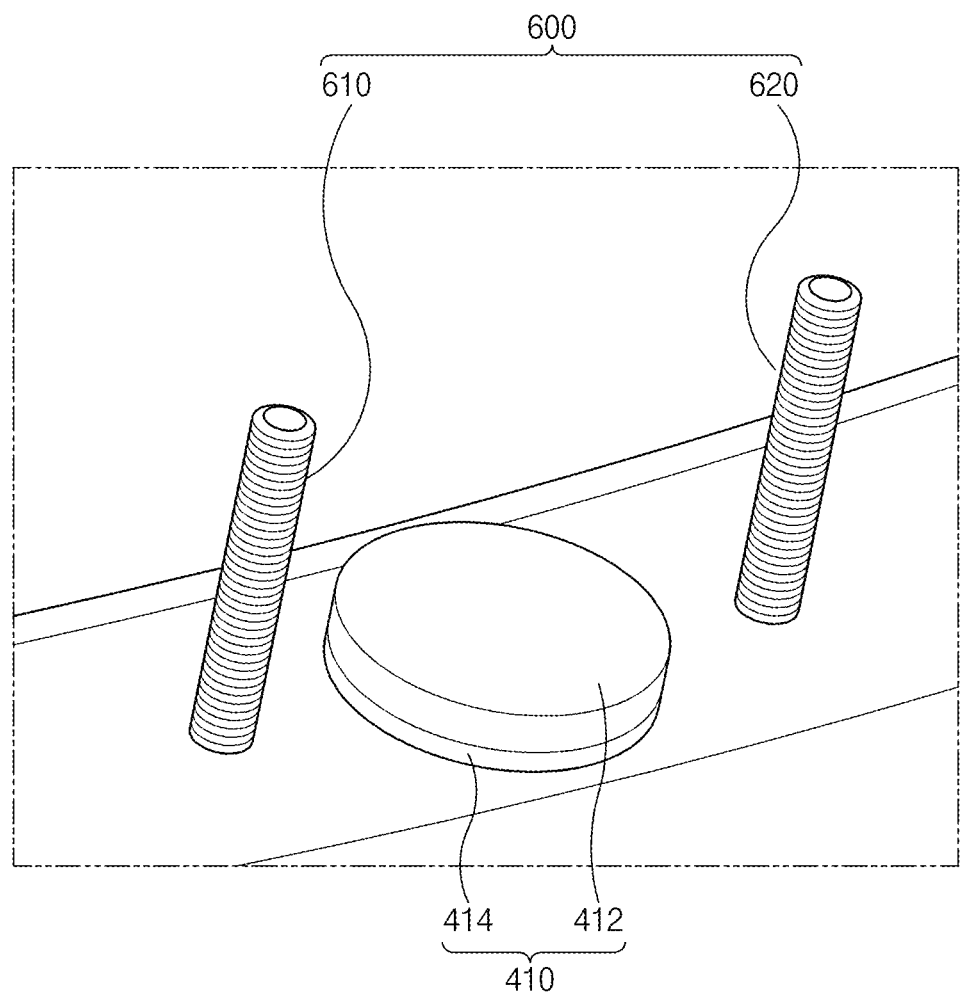
FIG. 8 is an enlarged view illustrating a first module in FIG. 7 and the surrounding thereof.
Figure 9:
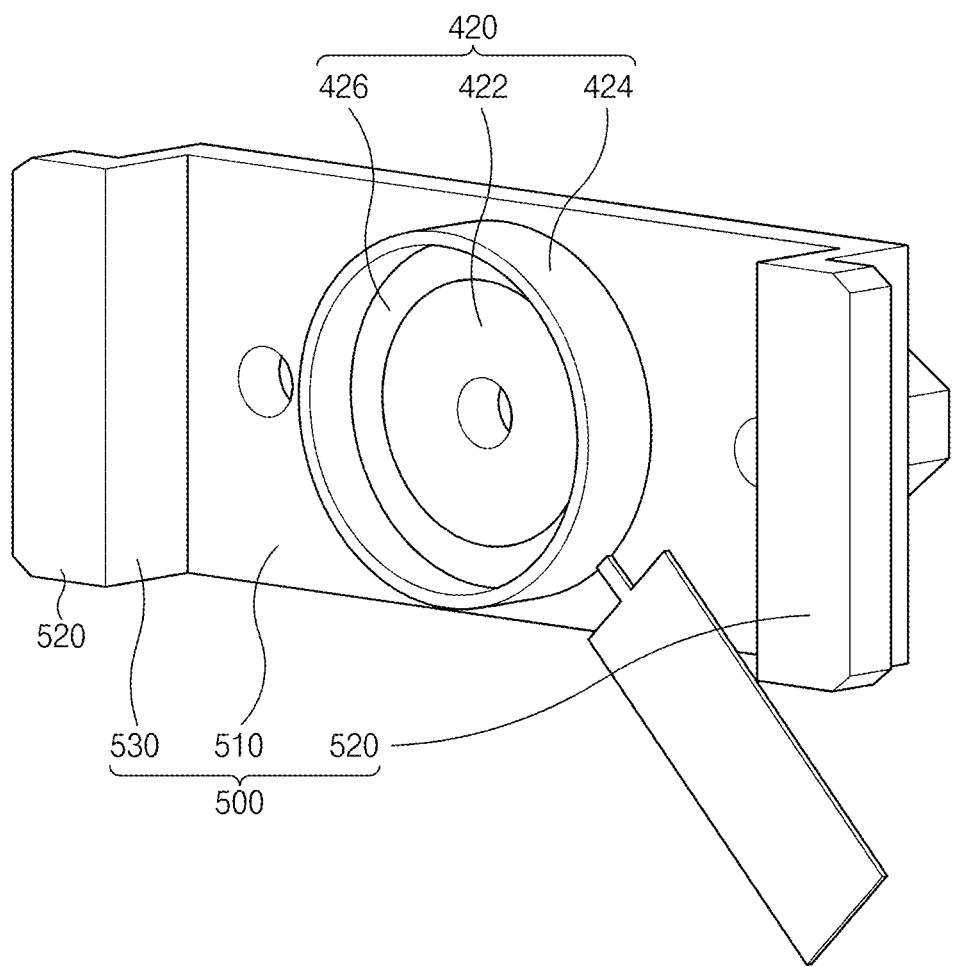
FIG. 9 is an enlarged view illustrating a bracket member and a second module in FIG. 7.
Figure 10:
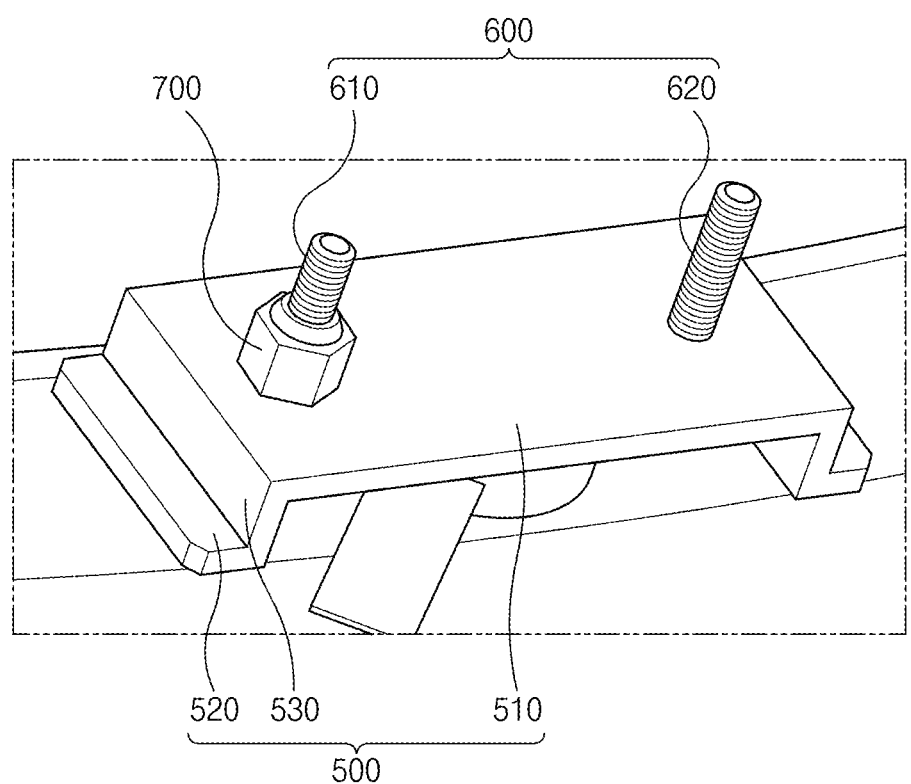
FIG. 10 is an enlarged view illustrating the bracket member, a bolt member, and a nut member in FIG. 7.
Figure 11:
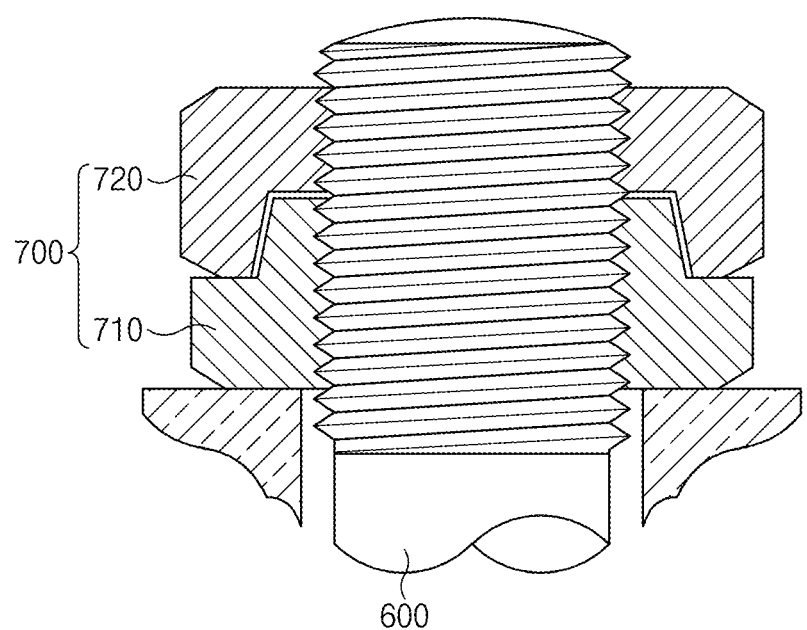
FIG. 11 is a cross-sectional view illustrating a coupling structure between the bolt member and the nut member in FIG. 10.

FIG. 7 is a perspective view of a lamp for a vehicle according to another example of the present disclosure, and FIG. 8 is an enlarged view illustrating a first module in FIG. 7 and the surrounding thereof. FIG. 9 is an enlarged view illustrating a bracket member and a second module in FIG. 7, and FIG. 10 is an enlarged view illustrating the bracket member, a bolt member, and a nut member in FIG. 7. FIG. 11 is a cross-sectional view illustrating a coupling structure between the bolt member and the nut member in FIG. 10.

The lamp according to another example of the present disclosure to be described with reference to FIGS. 7 to 11 differs from the lamp according to the embodiment of the present disclosure described above with reference to FIGS. 1 to 6 in that the second module is fixed to the bracket member instead of the lamp bezel part. The configurations described above with reference to FIGS. 1 to 6 may likewise be applied to another example of the present disclosure, except for the above-mentioned contents.

With reference to FIGS. 7 to 11, the lamp 10 according to another example of the present disclosure may include a bracket member 500 to which the second module 420 is fixedly coupled. Therefore, according to another example of the present disclosure, the above-mentioned groove region 150 (see FIG. 5 or the like) may be formed in the bracket member 500. In case that the groove region is formed in the bracket member 500, the description described above with reference to FIG. 5 may likewise be applied to the description of the groove region.

Meanwhile, according to another example of the present disclosure, the bracket member 500 may be fixedly coupled to the outer lens part 200. For example, as illustrated in FIGS. 7 to 11, the lamp 10 according to another example of the present disclosure may further include a bolt member 600 protruding from the inner surface of the outer lens part 200 toward the bracket member 500 and configured to penetrate the bracket member 500, and a nut member 700 provided to face the inner surface of the outer lens part 200 with the bracket member 500 interposed therebetween, the nut member 700 being coupled to the bolt member 600 in a bolt-nut manner. The bolt member 600 may be provided as a plurality of bolt members 600 so that the bracket member 500 may be more securely fixed to the outer lens part 200. For example, as illustrated in FIG. 8 or the like, the bolt members 600 may include a first bolt member 610 and a second bolt member 620 provided to face each other with the first module 410 interposed therebetween.

Meanwhile, the bracket member 500 may be divided into a plurality of regions. For example, the bracket member 500 may include a central region 510 provided to be spaced apart from the inner surface of the outer lens part 200 and configured such that the second module 420 is fixed to the central region 510, peripheral regions 520 provided at one side of the central region 510, spaced apart from each other toward the inner surface of the outer lens part 200, and at least partially tightly attached to the inner surface of the outer lens part 200, and connection regions 530 configured to connect the central region 510 and the peripheral regions 520. It may be understood that stepped portions may be formed between the central region 510 and the peripheral regions 520, and the stepped portions may be formed by the connection regions 530. In this case, the above-mentioned bolt member 600 may penetrate the central region 510. For example, as illustrated in FIGS. 9 and 10, the peripheral regions 520 may be provided at two opposite sides of the central region 510.

Meanwhile, the nut member 700 coupled to one bolt member 600 may include a plurality of components. More specifically, as illustrated in FIG. 11, the nut member 700 may include a first nut member 710 coupled to the bolt member 600 in a bolt-nut manner in a state in which the first nut member 710 is in contact with the bracket member 500, and a second nut member 720 provided to face the bracket member 500 with the first nut member 710 interposed therebetween, the second nut member 720 being coupled to the bolt member 600 and the first nut member 710. As described above, in case that the plurality of nut members 710 and 720 is coupled to the bolt member 600, a force for fixing the bracket member 500 to the outer lens part 200 may be further increased.

Figure 12:
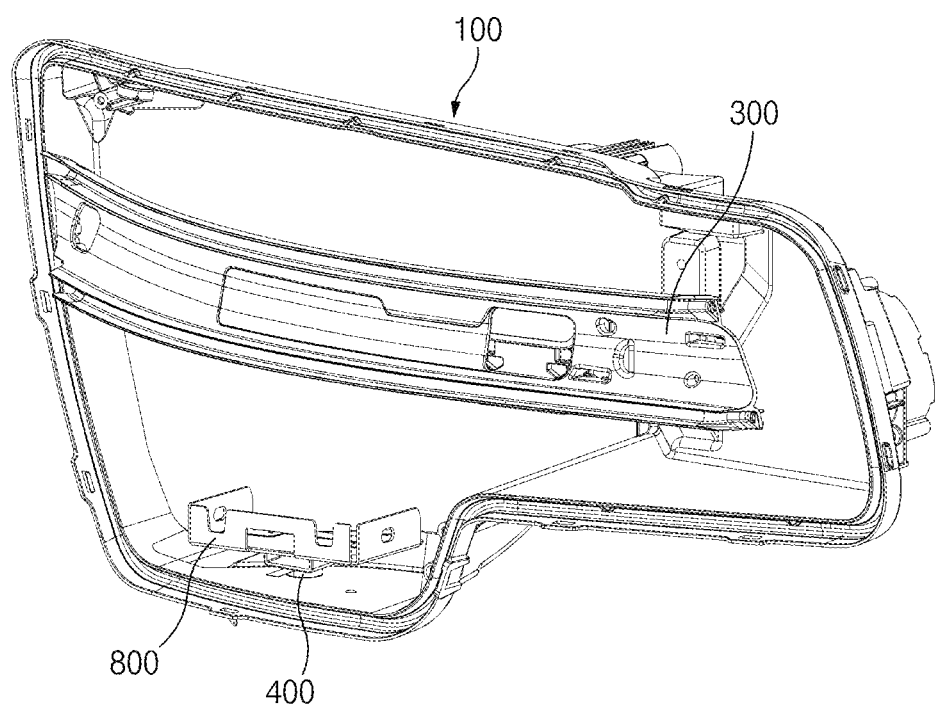
FIG. 12 is a perspective view of a lamp for a vehicle according to still another example of the present disclosure.
Figure 13:
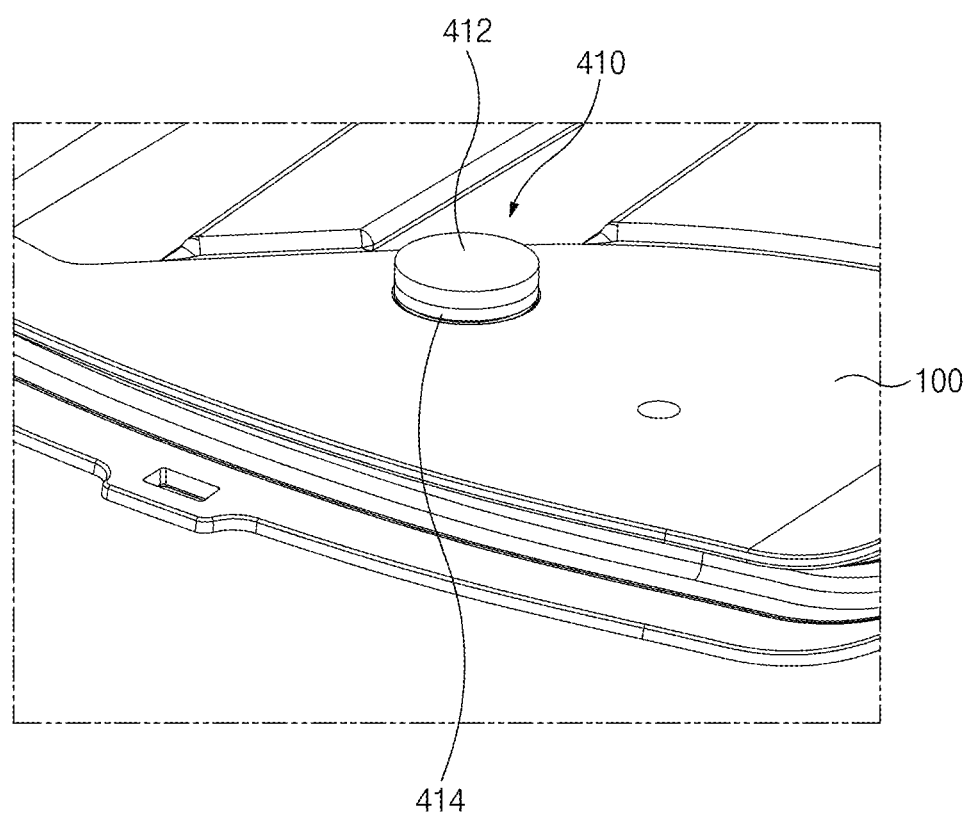
FIG. 13 is an enlarged view illustrating a first module in FIG. 12 and the surrounding thereof.
Figure 14:
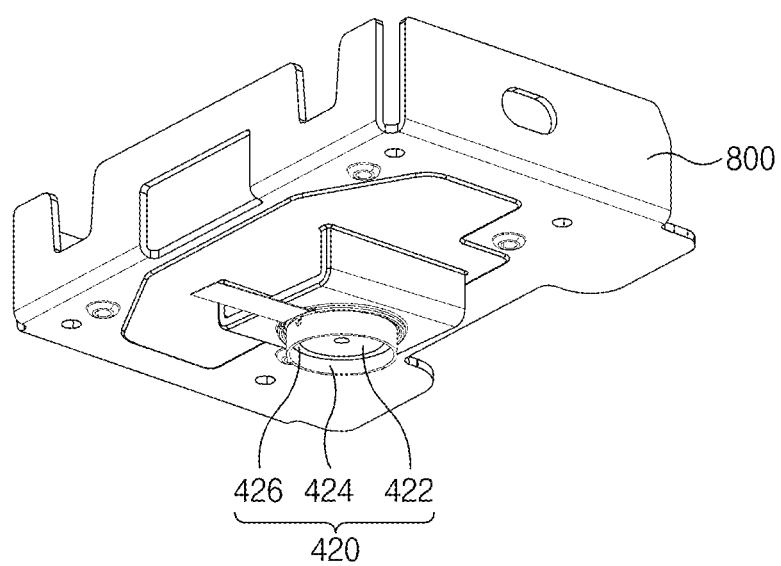
FIG. 14 is an enlarged view illustrating a heat sink and a second module in FIG. 12.

FIG. 12 is a perspective view of a lamp for a vehicle according to still another example of the present disclosure, and FIG. 13 is an enlarged view illustrating a first module in FIG. 12 and the surrounding thereof. FIG. 14 is an enlarged view illustrating a heat sink and a second module in FIG. 12.

The lamp according to still another example of the present disclosure to be described with reference to FIGS. 12 to 14 differs from the lamp according to the embodiment of the present disclosure described above with reference to FIGS. 1 to 6 in that the second module is fixed to the heat sink instead of the lamp bezel part. The configurations described above with reference to FIGS. 1 to 6 may likewise be applied to still another example of the present disclosure, except for the above-mentioned contents.

With reference to FIGS. 12 to 14, the lamp 10 according to still another embodiment of the present disclosure may further include a heat sink 800 provided in the above-mentioned internal space. The heat sink 800 may be configured to absorb heat generated in the lamp 10, particularly, heat generated from the light source and discharge the heat to the outside. In this case, according to still another embodiment of the present disclosure, one side of the second module 420 may be fixed to the heat sink 800.

Meanwhile, according to still another embodiment of the present disclosure, one side of the first module 410 may be fixed to the inner surface of the lamp housing part 100. More specifically, one side of the first module 410 may be accommodated in the groove region 150 (see FIG. 5 or the like) formed in an upper or lower region of the inner surface of the lamp housing part 100 that extends in a direction intersecting the upward/downward direction. One side of the second module 420 may be fixed to an upper or lower surface of the heat sink 800. FIGS. 12 and 14 illustrate states in which the first module 410 is accommodated and fixed in the lower region of the lamp housing part 100, and the second module 420 is fixed to the lower surface of the heat sink 800.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:
a lamp housing part having an internal space configured to accommodate a light source;
an outer lens part coupled to one side of the lamp housing part and configured to cover the internal space; and
a vibration part fixed to the lamp housing part or the outer lens part,
wherein the vibration part comprises:
a first module including a first magnet, and fixed to one side of the outer lens part; and
a second module facing the first module, and including:
a second magnet facing the first magnet;
a second magnet fixing portion configured to accommodate the second magnet; and
a coil member provided at one side of the second magnet and accommodated in the second magnet fixing portion,
wherein a groove region is formed in an inner surface of the outer lens part or an inner surface of the lamp housing part, and
wherein the groove region has a recessed shape and defines a space that accommodates at least a partial region of the first module.

2. The lamp of claim 1, wherein the vibration part further comprises a first bonding member provided in the space defined by the groove region, the first bonding member being provided between the first module and the inner surface of the outer lens part or the inner surface of the lamp housing part.

3. The lamp of claim 2, wherein the groove region comprises:
a first groove region configured to define a space that accommodates the first bonding member; and
a second groove region formed at one side of the first groove region and configured to define a space that accommodates the first module, and
wherein a stepped portion is formed at a boundary between the first groove region and the second groove region.

4. The lamp of claim 3, wherein a width of the first groove region in a direction intersecting a direction in which the first module faces the first bonding member is smaller than a width of the second groove region.

5. The lamp of claim 1, wherein the outer lens part comprises:
a first outer lens region having a first transmittance rate corresponding to a transmittance rate for visible rays; and
a second outer lens region having a second transmittance rate corresponding to a transmittance rate for visible rays lower than the first transmittance rate, and
wherein the first module is accommodated in the groove region formed in the second outer lens region.

6. The lamp of claim 1, further comprising:
a lamp bezel part having one side fixedly coupled to the lamp housing part, the lamp bezel part being provided to at least partially face the outer lens part,
wherein the second module is fixed to one side of the lamp bezel part.

7. The lamp of claim 6, wherein the lamp bezel part is made of a material having impermeability for visible rays.

8. The lamp of claim 6, wherein a bezel groove region is formed in the lamp bezel part, and
wherein the bezel groove region has a recessed shape and defines a space that accommodates at least a partial region of the second module.

9. The lamp of claim 8, wherein the vibration part further comprises a second bonding member provided in the space defined by the bezel groove region, the second bonding member being provided between the lamp bezel part and the second module.

10. The lamp of claim 9, wherein the bezel groove region comprises:
a first bezel groove region configured to define a space that accommodates the second bonding member; and
a second bezel groove region formed at one side of the first bezel groove region and configured to define a space that accommodates the second module, and
wherein a stepped portion is formed at a boundary between the first bezel groove region and the second bezel groove region.

11. The lamp of claim 10, wherein a width of the first bezel groove region in a direction intersecting a direction in which the second module faces the second bonding member is smaller than a groove of the second bezel groove region.

12. The lamp of claim 1, further comprising:
a bracket member to which the second module is fixedly coupled;
a bolt member protruding from the inner surface of the outer lens part toward the bracket member and configured to penetrate the bracket member; and
a nut member provided to face the inner surface of the outer lens part with the bracket member interposed therebetween, the nut member being coupled to the bolt member in a bolt-nut manner.

13. The lamp of claim 12, wherein the bolt member comprises a first bolt member and a second bolt member provided to face each other with the first module interposed therebetween.

14. The lamp of claim 12, wherein the bracket member comprises:
a central region provided to be spaced apart from the inner surface of the outer lens part and configured such that the second module is fixed to the central region;
peripheral regions provided at one side of the central region, provided to be spaced apart from each other toward the inner surface of the outer lens part, and at least partially tightly attached to the inner surface of the outer lens part; and
connection regions configured to connect the central region and the peripheral regions.

15. The lamp of claim 14, wherein the bolt member penetrates the central region.

16. The lamp of claim 12, wherein the nut member comprises:
a first nut member coupled to the bolt member in a bolt-nut manner in a state in which the first nut member is in contact with the bracket member; and
a second nut member provided to face the bracket member with the first nut member interposed therebetween, the second nut member being coupled to the bolt member and the first nut member.

17. The lamp of claim 1, further comprising:
a heat sink provided in the internal space,
wherein one side of the second module is fixed to the heat sink.

18. The lamp of claim 17, wherein one side of the first module is accommodated in the groove region formed in an upper or lower region of the inner surface of the lamp housing part that extends in a direction intersecting an upward/downward direction, and
wherein one side of the second module is fixed to an upper or lower surface of the heat sink.

19. A lamp system for a vehicle, the system comprising:
a lamp housing part having an internal space configured to accommodate a light source;
an outer lens part coupled to one side of the lamp housing part and configured to cover the internal space; and
a vibration part fixed to the lamp housing part or the outer lens part, the vibration part including:
a first module including a first magnet, and fixed to one side of the outer lens part; and
a second module facing the first module, and including:
a second magnet facing the first magnet,
a second magnet fixing portion configured to accommodate the second magnet; and
a coil member provided at one side of the second magnet and accommodated in the second magnet fixing portion,
wherein, in a first state, a constant interval between is maintained by the repulsive force between the first magnet and the second magnet, and
wherein in a second state, an electric current is supplied to the coil member and a force applied between the first module and the second module is changed over time by an electromagnetic force, such that the first module vibrates to generate a sound output from the lamp.

20. The system of claim 19, wherein a groove region is formed in an inner surface of the outer lens part or an inner surface of the lamp housing part, and
wherein the groove region has a recessed shape and defines a space that accommodates at least a partial region of the first module.

* * * * *